United States Patent
Inoue et al.

(10) Patent No.: US 8,041,446 B2
(45) Date of Patent: Oct. 18, 2011

(54) POST-PROCESS SIZING CONTROL DEVICE FOR GRINDING MACHINE

(75) Inventors: Masaharu Inoue, Obu (JP); Tomohisa Yamaguchi, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 475 days.

(21) Appl. No.: 12/362,999

(22) Filed: Jan. 30, 2009

(65) Prior Publication Data

US 2009/0247049 A1 Oct. 1, 2009

(30) Foreign Application Priority Data

Mar. 31, 2008 (JP) ................................. 2008-092988

(51) Int. Cl.
G06F 19/00 (2011.01)
B24B 49/00 (2006.01)
B24B 51/00 (2006.01)
B24B 7/00 (2006.01)
B24B 7/30 (2006.01)

(52) U.S. Cl. .................. 700/164; 451/1; 451/5; 451/25; 451/28; 451/65; 700/193

(58) Field of Classification Search .................. 700/164, 700/193; 451/1, 5, 28
See application file for complete search history.

(56) References Cited

U.S. PATENT DOCUMENTS

| 3,703,100 | A | * | 11/1972 | Kikuchi et al. | ............. | 73/863.02 |
| 3,898,440 | A | * | 8/1975 | Fukuma et al. | ................ | 700/193 |
| 6,623,332 | B1 | * | 9/2003 | Junker | .............................. | 451/8 |
| 2002/0133268 | A1 | * | 9/2002 | Kato et al. | ..................... | 700/193 |

FOREIGN PATENT DOCUMENTS

| JP | 352026686 A | * | 2/1977 |
| JP | 5-84646 | | 4/1993 |
| JP | 05084646 A | * | 4/1993 |

* cited by examiner

*Primary Examiner* — Kakali Chaki
*Assistant Examiner* — Sivalingam Sivanesan
(74) *Attorney, Agent, or Firm* — Oblon, Spivak, McClelland, Maier & Neustadt, L.L.P.

(57) ABSTRACT

A post-process sizing control device is provided with origin compensation means for controlling a size measuring device to measure an actual size of a workpiece portion and for compensating the origin of a wheel head by a position compensation amount which corresponds to a difference between the actual size and a theoretical size derived from calculation and size measuring interval setting means for setting the number of workpieces which should be ground during the next size measuring interval which begins after the preceding origin compensation operation and ends with the next origin compensation operation. The size measuring interval setting means sets the number of workpieces which should be ground during the next size measuring interval, based on an average position compensation amount derived by dividing a position compensation amount for the last workpiece ground during the present size measuring interval by the number of workpieces ground during the present size measuring interval.

6 Claims, 8 Drawing Sheets

RFA: Rapid Feed Amount
RGIA: Rough Grinding Infeed Amount
FGIA: Finish Grinding Infeed Amount
PCA: Position Compensation Amount

FIG. 8

POST-PROCESS SIZING CONTROL DEVICE FOR GRINDING MACHINE

INCORPORATION BY REFERENCE

This application is based on and claims priority under 35 U.S.C. 119 with respect to Japanese patent application No. 2008-092988 filed on Mar. 31, 2008, the entire content of which is incorporated herein by reference.

BACKGROUND OF THE INVENTION

1. Field of the Invention

The present invention relates to a post-process sizing control device for measuring a machining portion of a workpiece to control a further infeed amount of a grinding wheel against the machining portion in a grinding machine.

2. Discussion of the Related Art

Generally, for grinding a workpiece, there has been used a numerically controllable grinding apparatus (numerical control grinding machine), wherein the workpiece is rotatably mounted on a work spindle and wherein the feed amount of a wheel head movable in a direction intersecting with the work spindle is controlled in synchronous relation with the rotation of the work spindle to perform a grinding operation. At this time, in order to perform the grinding efficiently, as a method of controlling the size, there has been known a post-process sizing control device which performs a rough grinding until a size with a grinding amount left for finish is reached, then measures the size after the rough grinding of the workpiece by a size measuring device provided in the grinding machine, calculates the difference between the actually measured size and a theoretical size derived from calculation, and compensates the position of the wheel head by a position compensation amount corresponding to the difference.

Then, in actually performing the post-process sizing control as described in JP5-84646 A, consideration has to be given to the following two states: the case of a cold starting, that is, an initial state that electric power is applied to the grinding machine after the same remains in power-off state for a long period of time, and the case of a warmed-up starting, that is, another state that the grinding machine has fully been warmed up by having been operated for a predetermined period of time after the input of electric power. It is well known that the fluctuation in finish sizes is suppressed in the warmed-up state rather than in the initial state of the cold starting. The known device is designed to perform the post-process sizing control at size measuring intervals which depend on program data which has been set in advance. When operated in accordance with the program data, the known device measures the sizes of workpieces at shorter size measuring intervals in the case of the cold starting involving a large fluctuation in sizes, but at longer size measuring intervals so that the measuring is performed at the rate, for example, of one for ten workpieces from the time when it is judged that the grinding machine would have been warmed up, because the fluctuation in sizes becomes small.

However, in the foregoing post-process sizing control device, the post-process sizing control is carried out at the size measuring intervals which have been set in advance, and no considerations are given to machine-dependant differences, the fluctuation in the ambient temperature, the length of the duration in which the grinding machine has been kept in the stop state. It occurs therefore that the post-process sizing control is executed at the size measuring intervals depending on the initially set program even in the absence of the need for size compensations. This causes the machining cycle time to be elongated and hence, the productivity to decline. Accordingly, there has been desired a system which is capable of executing the post-process sizing control at the most suitable size measuring intervals which are flexible in dependence on various states of the grinding machine.

SUMMARY OF THE INVENTION

It is therefore an object of the present invention to provide an improved post-process sizing control device capable of controllably switching size measuring intervals for sizing control in dependence on the state in grinding operation of the grinding machine.

Briefly, according to the present invention, there is provided an improved post-process sizing control device for a grinding machine having a workpiece support device for rotatably supporting a workpiece about a rotational axis; a wheel head rotatably carrying a grinding wheel and movable relative to the workpiece in a direction intersecting with the rotational axis; and a size measuring device for measuring the size of the workpiece. The post-process sizing control device comprises origin compensation means for controlling the size measuring device to measure an actual size of a portion of the workpiece ground with the grinding wheel on the wheel head which is advanced by a predetermined amount in the direction and for compensating the origin of the wheel head by a position compensation amount which corresponds to a difference between the actual size and a theoretical size derived from calculation which the portion of the workpiece should reach when the wheel head is advanced by the predetermined amount. The post-process sizing control device further comprises size measuring interval setting means for setting the number of workpieces which should be ground during the next size measuring interval which begins after the preceding position compensation operation and ends with the next position compensation operation each of which is performed by the origin compensation means. The size measuring interval setting means sets the number of workpieces which should be ground during the next size measuring interval, based on an average position compensation amount derived by dividing a position compensation amount which the origin compensation means determines for the last workpiece during the present size measuring interval, by the number of workpieces ground during the present size measuring interval.

With this construction, in setting the number of workpieces which should be ground during the next size measuring interval which begins after the preceding position compensation operation and ends with the next position compensation operation, the number of workpieces ground during the next size measuring interval is set based on the average position compensation amount derived by dividing the position compensation amount which the origin compensation means determines for the last workpiece during the present size measuring interval, by the number of workpieces ground during the present size measuring interval. Therefore, the next size measuring interval for sizing control can be set in dependence on the latest state of the grinding machine during the present size measuring interval, and any unnecessary measuring for sizing control can be prevented from being carried out, so that it becomes possible to efficiently perform the post-process sizing control and to improve the productivity through the shortening of the machining cycle time.

In another aspect of the present invention, there is provided an improved post-process sizing control device for a grinding machine having a workpiece support device for rotatably supporting a workpiece about a rotational axis; a wheel head rotatably carrying a grinding wheel and movable relative to the workpiece in a direction intersecting with the rotational axis; and a size measuring device for measuring the size of the workpiece. The post-process sizing control device comprises wheel head origin compensation means for controlling the size measuring device to measure an actual size of a portion of the workpiece ground with the grinding wheel on the wheel head which is advanced by a predetermined amount in the direction and for compensating the origin of the wheel head by a position compensation amount which corresponds to a difference between the actual size and a theoretical size derived from calculation which the portion of the workpiece should reach when the wheel head is advanced by the predetermined amount. The post-process sizing control device further comprises size measuring interval setting means for setting the number of workpieces which should be ground during the next size measuring interval which begins after the preceding position compensation operation and ends with the next position compensation operation each of which is performed by the wheel head origin compensation means. The size measuring interval setting means sets the number of workpieces which should be ground during the next size measuring interval based on an average position compensation difference derived by dividing the difference between position compensation amounts which the wheel head origin compensation means determines respectively for the last workpieces ground during the preceding and present size measuring intervals, by the number of workpieces ground during the present size measuring interval.

With this construction, in setting the number of workpieces which should be ground during the next size measuring interval which begins after the preceding position compensation operation and ends with the next position compensation operation, the number of workpieces ground during the next size measuring interval is set based on the average position compensation amount difference derived by dividing the difference between position compensation amounts which the wheel head origin compensation means determines respectively for the last workpieces ground during the preceding and present size measuring intervals, by the number of workpieces ground during the present size measuring interval. Therefore, the next size measuring interval for sizing control can be set in dependence on the latest state of the grinding machine during the present size measuring interval, and any unnecessary measuring for sizing control can be prevented from being carried out, so that it becomes possible to efficiently perform the post-process sizing control and to improve the productivity through the shortening of the machining cycle time.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
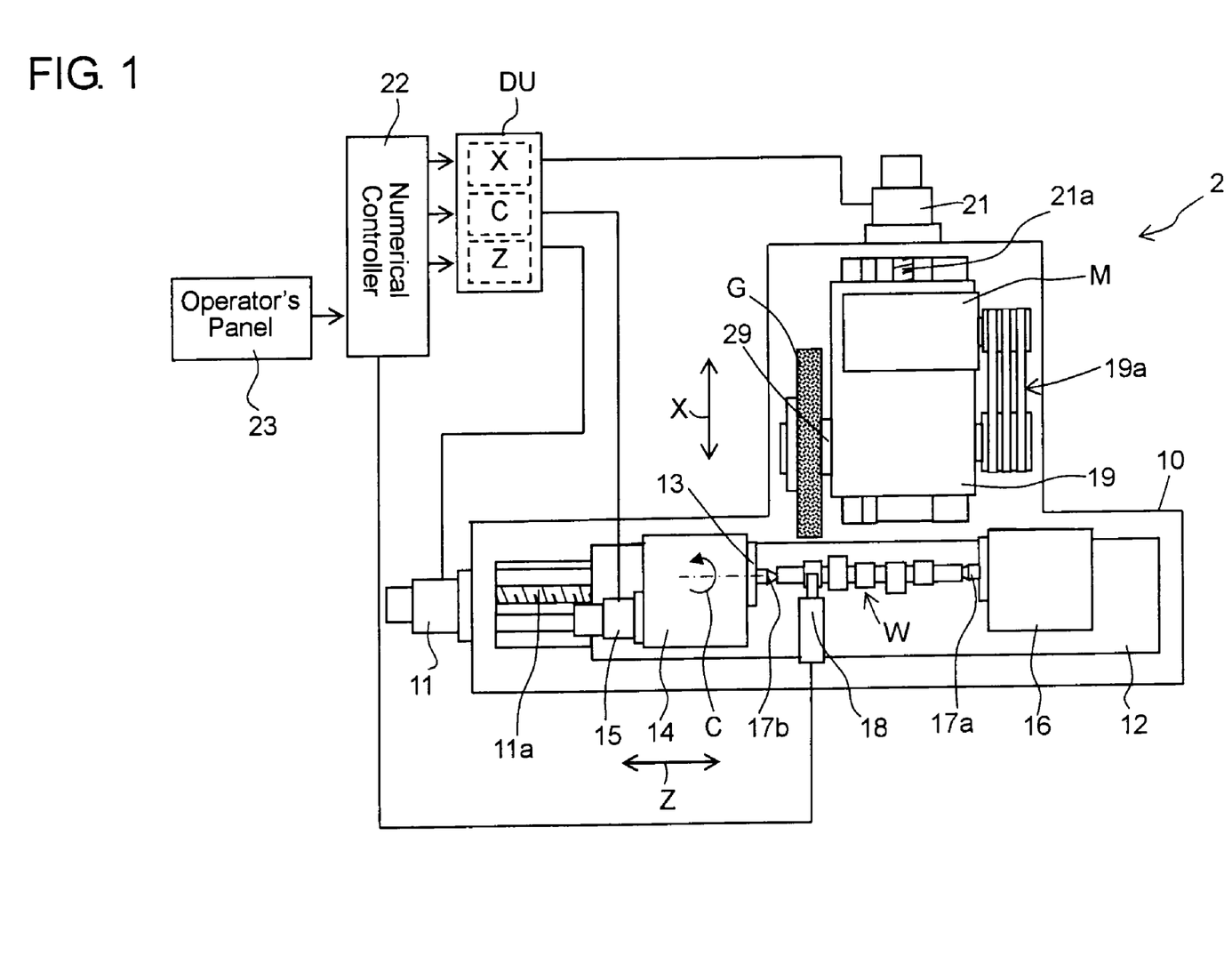
FIG. 1 is a schematic plan view of a numerical control grinding machine incorporating a post-process sizing control device in one embodiment according to the present invention.

Hereafter, a post-process sizing control in a first embodiment according to the present invention will be described in detail with reference to the accompanying drawings. Referring now to FIG. 1, a work table 12 which is driven by a servomotor 11 through a feed screw mechanism 11a is mounted on a bed 10 of a numerical control grinding machine 2 slidably in a Z-axis direction parallel to a work spindle axis. A work head 14 rotatably carrying a work spindle 13 is mounted on the work table 12, and the work spindle 13 is rotatable about a C-axis as the work spindle axis by a work spindle servomotor 15 mounted on the work head 14. A foot stock 16 is mounted on the right side of the work table 12 as viewed in FIG. 1. A workpiece W with non-circular portions thereon is rotatably supported by a center 17a on the foot stock 16 and a center 17b on the work spindle 13.

A wheel head 19 is mounted on the rear part of the bed 10 and is guided to be movable toward and away from the workpiece W. The wheel head 19 is drivingly connected to a wheel head servomotor 21 through a feed screw mechanism 21a. Thus, it is possible to advance or retract the wheel head 19 in an X-axis direction perpendicular to the Z-axis direction when the servomotor 21 is rotated in a positive or negative-going direction. A wheel spindle 29 driven by an electric motor M through a pulley-belt driving mechanism 19a is rotatably supported by the wheel head 19, and a grinding wheel G is attached to one end of the wheel spindle 29.

Figure 5:
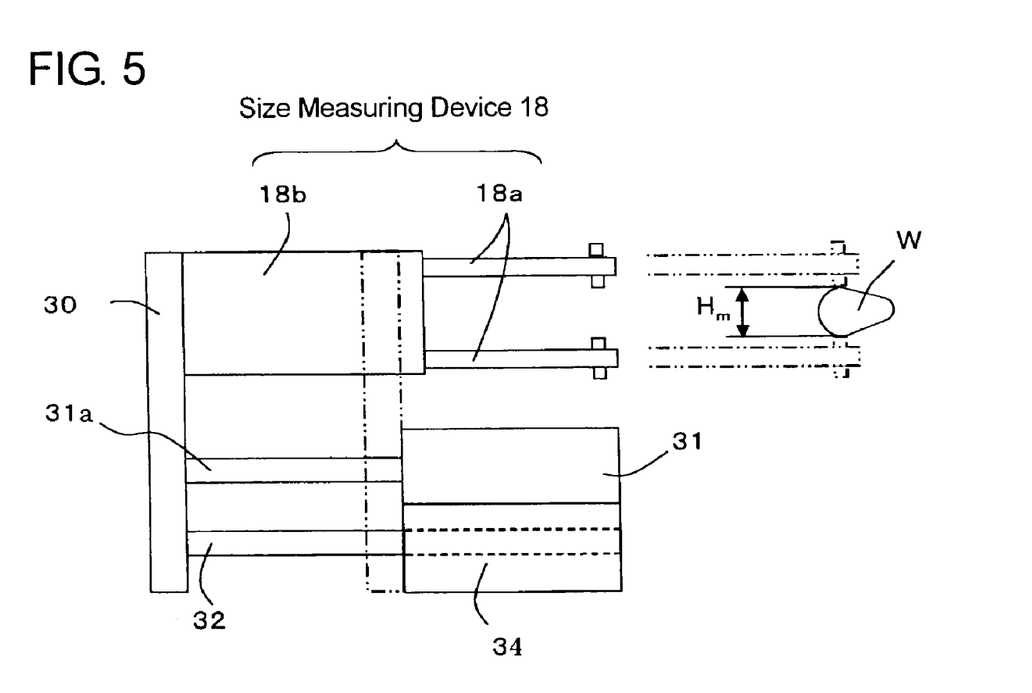
FIG. 5 is a schematic side view showing the configuration of a size measuring device used in the embodiments.

Further, a size measuring device 18 is mounted on the table 12 for measuring the diameter of a portion of the workpiece W after a part of the rough grinding thereof is completed with the grinding wheel G. FIG. 5 shows the configuration of the size measuring device 18. The size measuring device 18 is composed of a pair of feelers 18a which are brought into contact with the circumferential surface of the workpiece W from diametrically opposite sides thereof, and a displacement detecting unit 18b incorporating therein a differential transformer or the like for converting the mechanical displacement of one or both of the feelers 18a into an electric signal. The size measuring device 18 is connected to a piston rod 31a of a hydraulic cylinder 31 through a support member 30 and is movable by the hydraulic cylinder 31 toward and away from the workpiece W. A numeral 32 denotes a pilot bar, which is connected to the support member 30 and is slidably guided in a device base 34 secured on the work table 12, whereby the size measuring device 18 can be supported to be movable back and forth without being turned about the piston rod 31a. In measuring a base circle diameter Hm of a workpiece portion, as shown in FIG. 5, the size measuring device 18 is advanced by the hydraulic cylinder 31 from a retracted position indicated by the solid line there toward the workpiece W, and the feelers 18*a* are brought into engagements with a base circle portion being a measured portion of the workpiece W as indicated by the two-dot-chain line. Thus, the degree of the opening of the feelers 18*a* is detected by the displacement detecting unit 18*b* to be measured as the base circle diameter Hm, and the base circle diameter Hm so measured is converted into a digital signal to be stored in a RAM 26 referred to later.

Further, in order to control the rotation of the work spindle 13 and the back and forth movement of the wheel head 19, a numerical controller 22 with an operator's panel 23 is connected to the numerical control grinding machine 2 through a drive unit DU for controlling the movements of the respective axes (X-axis, C-axis and Z-axis).

Figure 2:
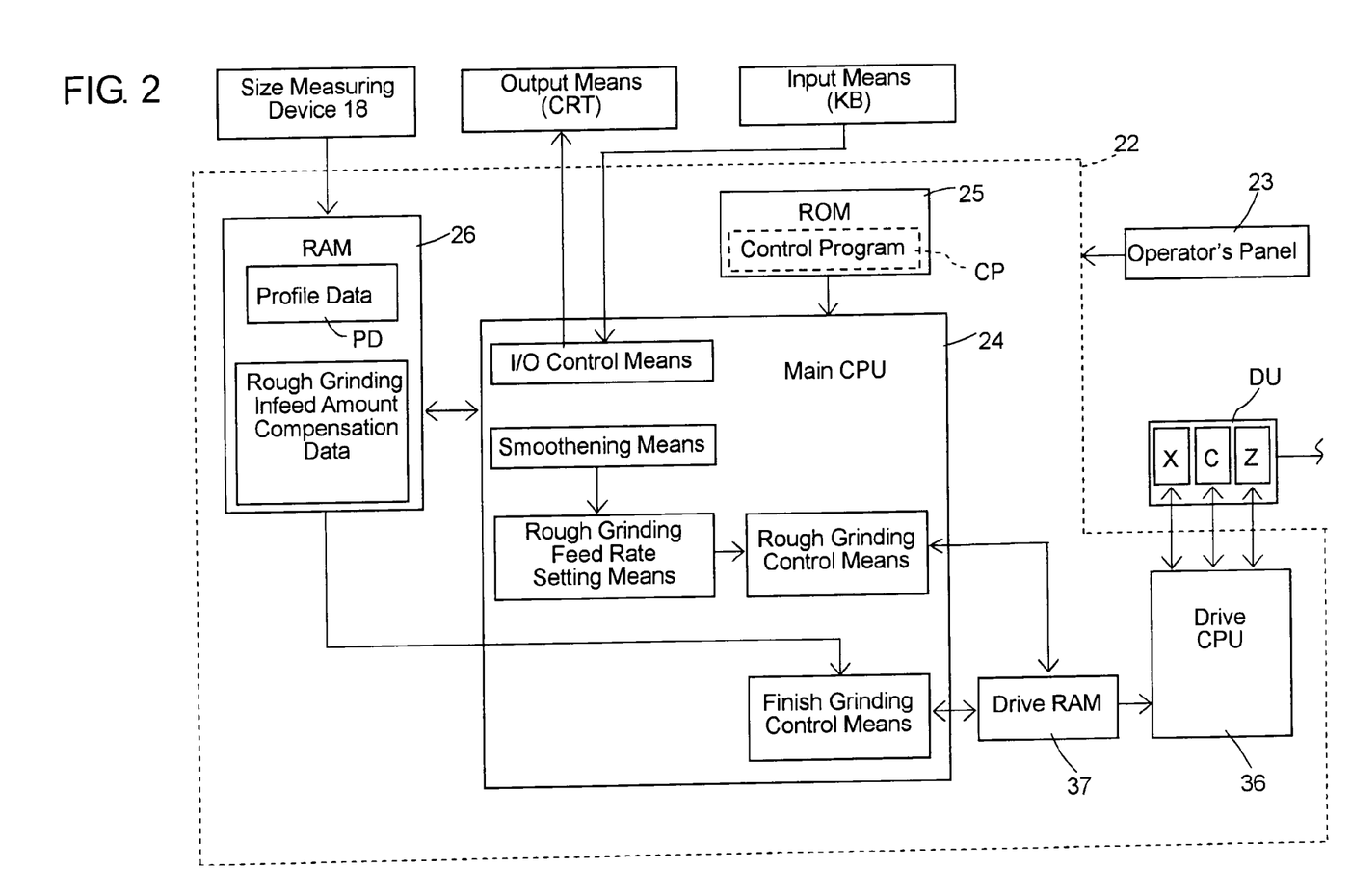
FIG. 2 is a block diagram showing the functional configuration of a numerical controller connected to the grinding machine.

The numerical controller 22 is a control device for controlling the rotation of the work spindle 13, the feed amounts of the wheel head 19 and the work table 12 and miscellaneous auxiliary functions in accordance with a machining program (numerical control program) inputted from the operator's panel 23 to grind the workpiece W. As shown in FIG. 2, the numerical controller 22 is composed mainly of a main CPU 24 for controlling the rotational motion of the work spindle 13, the feed movements of the work table 12 and the wheel head 19 and the like, a ROM 25 for storing a control program CP and the aforementioned RAM 26 for temporarily storing inputted data and the like. The RAM 26 stores a profile data PD for enabling the non-circular portion of the workpiece to be machined to a designated shape of profile. In accordance with the profile data PD, the wheel head 19 is given a feed amount in the X-axis direction for a unit rotational angle of the work spindle 13, and at the same time, a rotational speed VR1 of the work spindle 13 is designated, whereby a profile generating motion is performed. In the profile data PD, infeed amounts for infeeding the grinding wheel G against the workpiece W during the grinding operation have been added to the respective feed amounts of the wheel head 19 for respective rotational angles of the work spindle 13.

In addition, the numerical controller 22 is provided with a drive CPU 36 and a drive RAM 37 for driving the respective servomotors 11, 15 and 21. When position data respectively indicating the respective positions of the wheel head 19, the table 12 and the work spindle 13 is designated from the main CPU 24, the drive RAM 37 stores the designated data information and sends the same to the drive CPU 36. The drive CPU 36 performs arithmetic operations for acceleration, deceleration, interpolation of target points and so on, outputs data for positioning to interpolated points at a fixed frequency, and after pulse distribution calculations, outputs drive command pulses for the respective axes X, C, Z to the drive unit DU.

Next, a post-process sizing control device in the first embodiment will be described in the form that it is applied to the numerical control grinding machine 2 for grinding workpieces W each having a non-circular portion thereon. In the beginning, an unfinished workpiece W is supported between the work head 14 and the foot stock 16. Then, X-axis feed amounts for the wheel head 19 at the respective rotational angular positions of the work spindle 13 and a rotational speed VR1 for the work spindle 13 are designated in accordance with the profile date PD which has been stored in the RAM 26 by being inputted by a suitable input means, whereby the profile generating motion is performed. Since infeed amounts for infeeding the grinding wheel G against the workpiece W during the grinding operation are added in the profile data PD, the wheel head 19 is advanced at a rough grinding feed rate by, e.g., a first part of a rough grinding infeed amount (first infeed amount) subsequently to a rapid advance feed through a fixed amount at a rapid feed rate, whereby the rough grinding of the workpiece W is carried out.

Post-process sizing control is carried out after the rough grinding is completed by the first part of the rough grinding infeed amount. First of all, the wheel head 19 is retracted away from the workpiece W to the grinding start origin, and the work spindle 13 is stopped at a predetermined angular position to hold the non-circular portion of the workpiece W in a horizontal position. Where the non-circular portion of the workpiece W is a cam, for example, the cam is angularly positioned to direct a base circle portion thereof opposite to the grinding wheel G with a top portion facing the grinding wheel G, as shown in FIG. 5. Then, the size measuring device 18 is advanced by the operation of the hydraulic cylinder 31 toward the workpiece W as it is guided by the pilot bar 32, whereby the pair of feelers 18*a* are engaged with the base circle portion to be measured of the workpiece W which is stopped with the non-circular potion held horizontally. Thus, the opening degree of the feelers 18*a* is detected by the displacement detecting unit 18*b* as a base circle diameter Hm. The measured base circle diameter Hm is converted into a corresponding digital signal and is stored in the RAM 26. Subsequently, a machining error $\alpha$ being the difference between a base circle diameter (i.e., theoretical size) Hc which should be in calculation and the measured base circle diameter (i.e., actual size) Hm is calculated to be stored in the RAM 26, and the grinding start origin of the wheel head 19 is compensated by a position compensation amount $\alpha/2$ which is the half of the machining error $\alpha$.

Specifically, calculated is the difference $(Hm_1-Hc)=\alpha 1$ between the actual base circle diameter Hm1 of the first non-circular portion after the rough grinding of the same and the theoretical base circle diameter Hc derived from calculation, and the difference $\alpha 1$ is stored as a machining error in the RAM 26. At the same time, the wheel head 19 is advanced or retracted by the half $\alpha 1/2$ of the difference to compensate the grinding start origin by a position compensation amount $\alpha 1/2$. Thereafter, the wheel head 19 is advanced by the rapid feed amount and then, is advanced by the rough grinding infeed amount at the rough grinding feed rate, whereby the grinding wheel G is infed against the first non-circular portion by a second (i.e., remaining) part of the rough grinding infeed amount. Finally, the wheel head 19 is advanced by a finish grinding infeed amount (second infeed amount) at a finish grinding feed rate, whereby a finish grinding is performed on the first non-circular portion of the workpiece W. The first part of the rough grinding infeed amount may arbitrarily be chosen to be, e.g., one third or half distance of the rough grinding infeed amount.

Upon reaching a finish infeed end for the first non-circular portion, the grinding wheel 19 is retracted by a distance corresponding to the sum of the finish grinding infeed amount, the rough grinding infeed amount and the rapid feed amount, whereby the grinding start origin of the wheel head 19 is updated or renewed for a second or successive workpiece W. Subsequently, by advancing the wheel head 19 from the renewed grinding start origin, the rough grinding of the non-circular portion of the second workpiece W is started to follow the rapid feed. In the same manner as done with the non-circular portion of the first workpiece W, the base circle diameter Hm2 of the non-circular portion of the second workpiece W is measured by the size measuring device 18. The difference $(Hm2-Hc)=\alpha 2$ between the measured (actual) base circle diameter Hm2 and the theoretical base circle diameter Hc which should be in calculation is calculated, and the grinding start origin which has been compensated through the grinding of the non-circular portion of the first workpiece is further compensated by a position compensation amount $\alpha 2/2$ being the half of the difference $\alpha 2$. Thereafter, the wheel head 19 is advanced by the rapid feed amount, then is advanced to the rough grinding end position at the rough grinding feed rate, and finally, is advanced by the finish grinding infeed amount (second infeed amount) at the finish grinding feed rate, whereby a finish grinding is performed on the non-circular portion of the second workpiece W.

For a non-circular portion of a third workpiece W and those subsequent thereto, the following expression is used in calculating the next size measuring interval X which begins after the preceding position compensation operation and ends with the next position compensation operation, in each of which the position compensation of the wheel head 19 is performed by the use of measured data from the size measuring device 18. Herein, the size measuring interval X can be expressed as the number of non-circular portions which should be ground after the preceding position compensation operation and until the next grinding start origin compensation operation and which should be ground without being measured by the size measuring device except for the last one.

$X=P/\{\text{machining error } \alpha/(\text{the total number of non-circular portions ground after the preceding post-process sizing control to the next post-process sizing control})\}$ (Expression 1)

In the expression 1, it is judged that if the value X indicates 2 or larger, the post-process sizing control is not required for the next non-circular portion. In this case, the number of non-circular portions which are ground without being measured until the next post-process sizing control is determined as an integer which is taken out from a calculated quotient by disregarding fractions of the same. Symbol "P" represents a control accuracy as an acceptable limit or a target range being a value which is set taking the requirements to each kind of the products (i.e., non-circular portions of workpieces to be ground). Generally, the control accuracy P is determined by reference to an acceptable limit designated on a part drawing for the products or by converting the required process capability into an acceptable limit. Symbol "$\alpha$" represents a machining error between a theoretical base circle diameter Hc of the non-circular portion derived from calculation and an actual based circle diameter Hm measured by the size measuring device 18. However, symbol "$\alpha$" in a second embodiment referred to later represents the difference between a machining error determined in the last post-process sizing control and a machining error determined in the present post-process sizing control.

Next, the operation in the post-process sizing control in the first embodiment will be described with reference to a flow chart shown in FIG. 3. In the following description, for brevity in explanation, it is assumed that each of workpieces W successively ground has a single non-circular portion thereon to be ground. First of all, a first workpiece W to be machined is loaded (A) and is supported between the work spindle 13 and the foot stock 12. Then, a judgment is made as to whether or not, all of the workpieces W have been finished (step S1). The program being executed is terminated if the machining on all of the workpieces W have been finished, but moves to step S2 if not. If the workpiece W loaded at step S2 is the first one which is loaded just after the power input to the grinding machine 2 or just after the halt of operation for a relatively long period of time such as one hour or so, the operator inputs by the operator's panel 23 a signal indicating that the workpiece W is a first workpiece. Whether the state that the workpiece W having been loaded is either one of the states just after the power input and just after the halt of operation for a relatively long period of time or not is judged by the presence or absence of the signal indicating that the first workpiece has been loaded at step S2. If the signal is present, the state is judged to be just after the power input or just after the halt of operation (step S3). When so judged, the wheel head 19 is advanced by a predetermined feed amount at a predetermined rapid feed rate and then, is advanced by a first part of a rough grinding infeed amount at a rough grinding feed rate in the X-axis direction, so that a rough grinding is performed on a non-circular portion of the first workpiece W (step S4).

Following this, the wheel head 19 is retracted to the grinding start origin in the X-axis direction (step S5). Then, the rotation of the workpiece W is discontinued to direct the non-circular portion horizontally, and the size measuring device 18 is advanced, whereby an actual base circle diameter Hm1 of the roughly ground non-circular portion is measured by the size measuring device 18 (step S6). A machining error $\alpha 1$ is calculated from the difference between the actual base circle diameter Hm1 and a theoretical base circle diameter Hc derived from calculation (step S7). The wheel head 19 is moved (i.e., advanced or retracted in dependence on the calculation result) by a position compensation amount $\alpha 1/2$ corresponding to the half of the machining error $\alpha 1$ in the X-axis direction to compensate the grinding start origin (step S8). Then, the wheel head 19 is advanced by the rapid feed amount at the rapid feed rate in the X-axis direction and then, is advanced to a rough grinding end position at the rough grinding feed rate. The wheel head 19 is further advanced by a finish grinding infeed amount from the rough grinding end position, whereby a finish grinding is performed on the non-circular portion of the first workpiece (step S9). After the finish grinding, the grinding wheel 19 is retracted by the amount which is the sum of the rapid feed amount, the rough grinding infeed amount and the finish grinding infeed amount and thus, is retracted to the grinding start origin which has been renewed by the aforementioned position compensation. In this way, the grinding on the first workpiece W is completed (step S10), and the first workpiece W is unloaded (step S11).

Thereafter, a second workpiece W is loaded (A), and a judgment of whether or not all of the workpieces W to be machined have been machined is made in the same manner as the foregoing (step S1). The program is terminated if all of the workpieces W have been machined, but is moved to step S2 if not. A judgment is made again of whether or not, the state in which the workpiece W has been loaded is either one of the state being just after the power input and the state being just after the halt of the machine operation for the relatively long period of time (step S3), and because "NO" is answered in the judgment at this time, another judgment is made of whether or not, the workpiece W is a second one. Because of being the second one, the same steps S13-S19 as those steps S4-S10 are performed, and then, the value of the next size measuring interval X is calculated as an integer value disregarding fractions (step S20). Then, a judgment is made of whether or not the post-process sizing control is necessary for a workpiece W to be machined next. If the value of the size measuring interval X is smaller than "2", the post-process sizing control is judged to be necessary for the workpiece W to be machined next ("YES" at step S21), in which case, an every time flag is set to ON (step S22), and then, the second workpiece W having been ground is unloaded (step S23). If the value of the size measuring interval X indicates "2" or larger, the post-process sizing control is judged not to be done for the next or third workpiece. Thus, the every time flag is set to OFF (step S24), and the second workpiece W having been ground is unloaded (step S25). Then, the machining of the next workpiece W is performed, in which case, because the workpiece W is the third one, "NO" is answered at the judgments at steps S3 and S12, and step S26 is reached to judge whether or not the every time flag has been set to ON.

Figure 6:
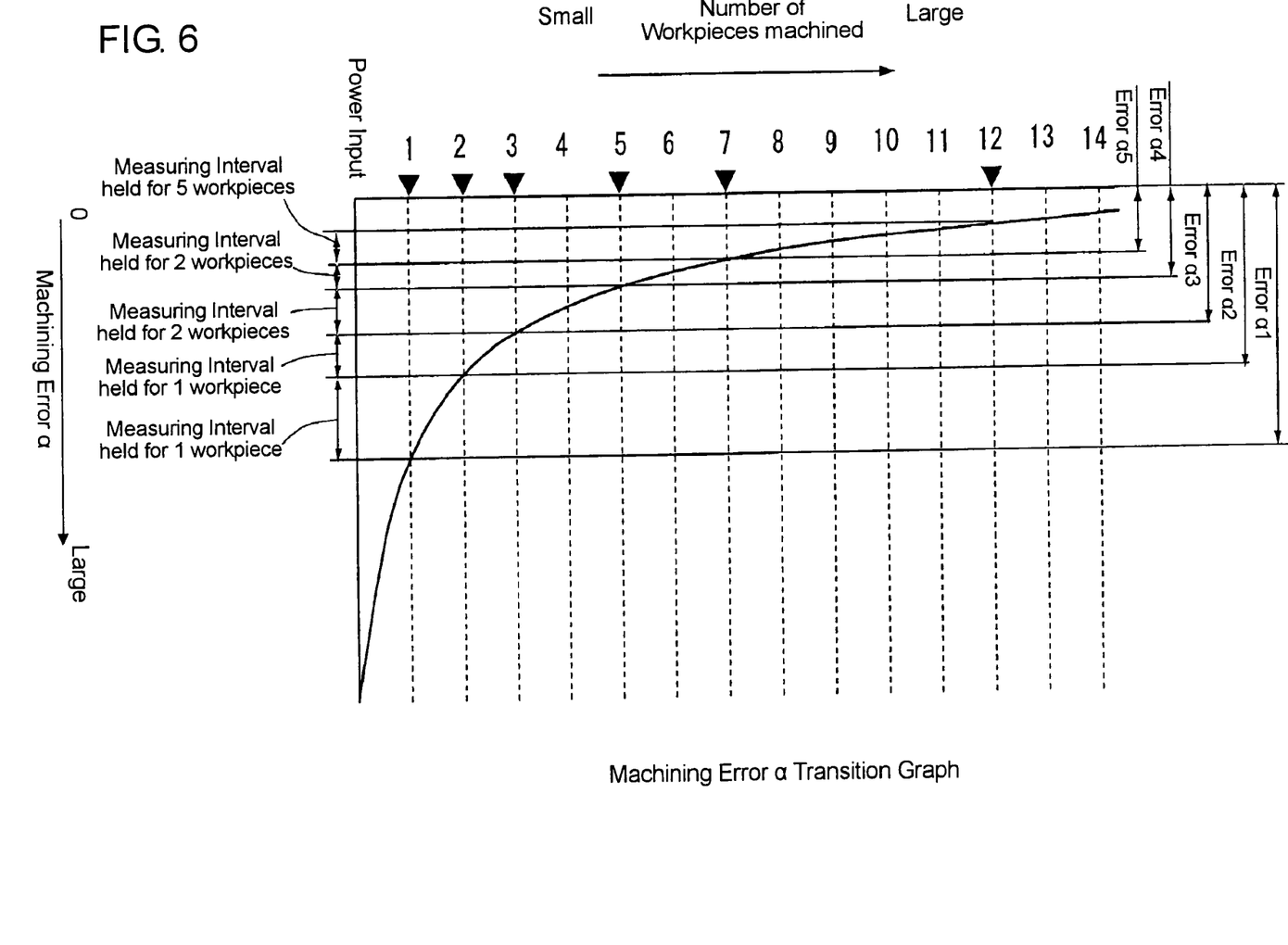
FIG. 6 is a graph showing the transition of machining errors which the numerical control grinding machine in the embodiments makes after the application of electric power.

If at the foregoing step S21, the post-process sizing control is judged to be necessary for the workpiece W to be machined next, step S26 is followed by steps S13-S19 to be executed again because the every time flag has been set to ON at this time. Thus, the value of the next size measuring interval X is calculated at step S20 for an integer value disregarding fractions, and the judgment at step S21 is again executed of whether or not the post-process sizing control is necessary for the workpiece W to be machined next. For example, in the case shown in FIG. 6, the third workpiece W needs the post-process sizing control. FIG. 6 shows the number of workpieces machined on the abscissas and machining errors $\alpha$ measured for the respective workpieces on the ordinate. Marks "▼" on the respective workpieces denote that the post-process sizing control is necessary for the respective workpieces.

However, if the next size measuring interval X for the post-process sizing control has been judged to be lengthened at step 21 in the processing for the second workpiece W, the every time flag has been set to "OFF" (step S24), in which case, the subsequent judgment at step S26 becomes "NO", whereby one or more workpieces W are successively machined by the executions of steps S28 through S30 until the value of the next size measuring interval X indicating an ordinal number of the next workpiece which needs the post-process sizing control is reduced to "1" at step S31. Here, symbol "i" at steps S27 and S31 denotes as variable the value of the next size measuring interval X. The symbol "i" or the value of the next size measuring interval X is subtracted by one "1" each time step S31 is executed, and when "i=1" is attained, the program is moved from step S27 to step S13, whereby a new value of the size measuring interval X indicating the ordinal number of the next workpiece needing the post-process sizing control is determined each time steps S13 through S21 are again executed. In this way, the machining of a plurality of workpieces W is successively performed in accordance with the flow chart 1 until the machining of all of the workpieces W to be machined is completed. Accordingly, in the present embodiment, because the next size measuring interval X or an ordinal number of the workpiece needing the post-process sizing control is determined in dependence on the latest state of the grinding machine, any unnecessary measuring for sizing control can be prevented from being carried out, so that it becomes possible to efficiently perform the post-process sizing control and to improve the productivity through the shortening of the machining cycle time. Nevertheless, there can be obtained products which fully satisfy the process capability.

Second Embodiment

In the foregoing first embodiment, each time the post-process sizing control is performed in the course of successive grindings of the workpieces, the grinding start origin is altered by the foregoing $\alpha/2$ to shift the position of the wheel head 19, and the wheel head 19 is retracted to the compensated grinding start origin in the retraction feed. In a second embodiment described below, on the contrary, the grinding start origin is not altered, wherein the wheel head 19 is retracted to the initial grinding start origin whenever retracted.

The operation of the post-process sizing control in the second embodiment will be described with reference to a flow chart 2 shown in FIG. 4. One of the differences from the first embodiment is that after the rough infeed is completed by the first part of the rough grinding infeed amount, the wheel head 19 is not moved for position compensation between steps S40 and S41 as well as between steps S48 and S49.

Other differences are that at each of steps S41 and S49, the wheel head 19 is first moved by the sum of the position compensation amount $\alpha/2$ and the rapid feed amount, is then moved by the rough grinding infeed amount at the rough grinding feed rate and is further advanced by the finish grinding infeed amount at the finish grinding feed rate to perform the finish grinding and that at each of steps S42 and S50, the wheel head 19 is retracted to the initial grinding start origin by being retracted by the sum of the finish grinding infeed amount, the rough grinding infeed amount, the rapid feed amount and the position compensation amount $\alpha/2$.

Further, the machining error $\alpha$ being a factor of the foregoing expression 1 which is used in calculating the value of the next size measuring interval X at step S51 represents the difference between a machining error determined at the time of the last post-process sizing control and a machining error determined at the time of the present post-process sizing control. In the machining of each workpiece for which the post-process sizing control is not required, that is, in the machining of each of the workpieces which are ground between the last and next post-process sizing controls, the infeed amount for the rough grinding following the rapid feed is set at step S59 to the sum of the position compensation amount $\alpha/2$ and the rough grinding infeed amount. Accordingly, also in the second embodiment, any unnecessary measuring for sizing control can be prevented from being carried out, so that it becomes possible to efficiently perform the post-process sizing control and to improve the productivity through the shortening of the machining cycle time. Nevertheless, there can be obtained products which fully satisfy the process capability.

Third Embodiment

In the foregoing first and second embodiments, description has been made regarding the case that workpieces each having one non-circular portion are ground successively. However, the present invention can equally applicable to one cylindrical grinding machine for successively grinding a plurality of workpieces each having a cylindrical portion to be ground. The cylindrical grinding machine to which the present invention is applied will be described hereafter as a third embodiment. In the third embodiment, the differences from the foregoing first embodiment will be described, while the same constructions and functions as those of the first embodiment will be omitted from being described in detail.

It has heretofore been practiced to perform a so-called "in-process sizing control" wherein the size of a workpiece is measured at the same time as the grinding operation of the workpiece. The in-process sizing control is known as a grinding method in which a wheel head is moved based on infeed amounts which have been calculated in advance by a control device and in which during the machining operation of a workpiece, the diameter of the workpiece is measured by an in-process gauge (workpiece measuring device) to terminate the machining when the workpiece diameter reaches a target size. In the machining under the in-process sizing control, it is often the case that in dependence on the warmed-up state of the grinding machine or the like, an error $\alpha$ is produced between a theoretical infeed amount for a wheel head calculated by the control device and an actual infeed amount by which the wheel head is actually infed under the in-process sizing control. In this case, the grinding start origin is compensated by a position compensation amount corresponding to the half $\alpha/2$ of the error, and each of workpieces to be machined subsequently is ground with a grinding wheel on the wheel head which is advanced from a compensated grinding start origin by the infeed amount calculated by the control device, without being subjected to the in-process sizing control. However, since the number of workpieces to be machined without being subjected to the in-process sizing control is determined based on a value set in advance, there is a possibility that unnecessary in-process sizing control is executed frequently.

Figure 7:
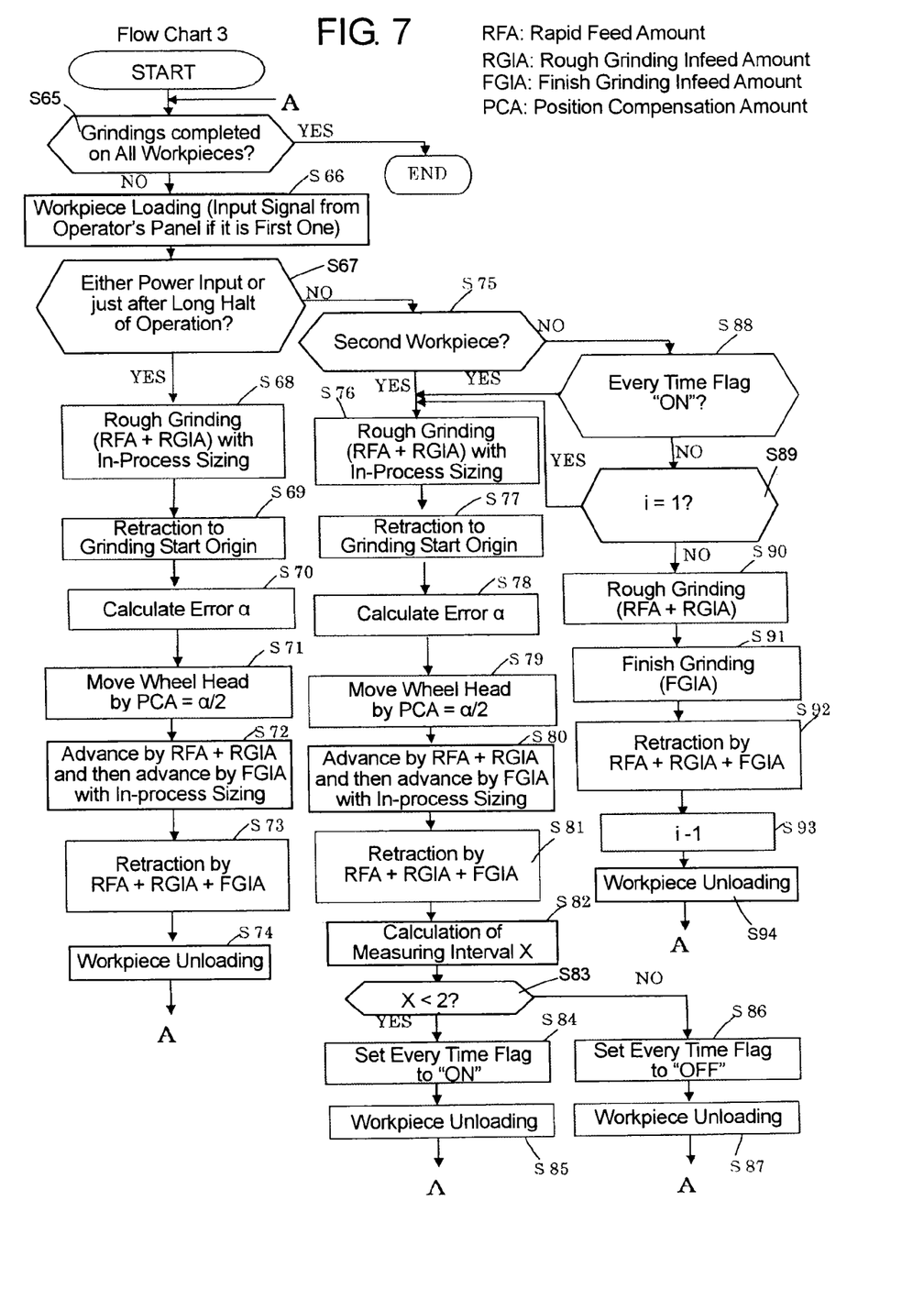
FIG. 7 is a flow chart 3 executed by the numerical controller in setting a size measuring interval for an in-process sizing control in the grinding machine in a third embodiment.

In the present third embodiment, the grinding start origin of the wheel head is first compensated by a position compensation amount which corresponds to an error $\alpha$ between a theoretical size derived from calculation and an actual size measured under the in-process sizing control of a workpiece portion being ground with a grinding wheel. Then, the number X of workpieces which should be ground without being subjected to the in-process sizing control except for the last one is set by the size measuring interval setting means. In other words, the size measuring interval setting means sets as the next size measuring interval X the ordinal number of the workpiece which is the last one of workpieces ground after the last or preceding in-process sizing control and which should be ground under the next in-process sizing control. In setting the number of workpieces or the ordinal number X as the next size measuring interval (step S82), a unit or average position compensation amount ($\alpha/2/n$) is calculated by dividing the position compensation amount (i.e., half $\alpha/2$ of the error $\alpha$) which the origin compensation means determines for the last workpiece during the present size measuring interval, by the number (n) of workpieces ground during the present size measuring interval. Then, the number of workpieces or the ordinal number (X) as the next size measuring interval is set based on the unit or average position compensation amount ($\alpha/2/n$).

FIG. 7 shows a flow chart 3 (composed of steps S65 through S94) for setting the next size measuring interval in the third embodiment. One of the differences from the foregoing first embodiment is that at each of steps S68 and S76 respectively corresponding to steps S4 and S13 in FIG. 3, the in-process sizing control is executed, so that a grinding operation is performed with the diameter of the workpiece being measured by the size measuring device 18. Other differences are that the flow chart 3 shown in FIG. 7 does not include those corresponding to steps S6 and S15 in FIG. 3 because the size measuring of the workpiece diameter has already been executed during each of steps S68 and S76 and that each of steps S72 and S80 respectively corresponding to steps S9 and S18 involves the in-process sizing control (i.e., the grinding operation control with the workpiece diameter measured by the size measuring device 18) which is executed simultaneously with a finish grinding. Except for those steps mentioned above, the present third embodiment is the same as the foregoing first embodiment. Accordingly, also in the present third embodiment, because the next size measuring interval for sizing control is determined in dependence on the latest state of the grinding machine, any unnecessary measuring for sizing control can be prevented from being carried out, so that it becomes possible to efficiently perform the post-process sizing control and to improve the productivity through the shortening of the machining cycle time. Nevertheless, there can be obtained products which fully satisfy the process capability.

Fourth Embodiment

Figure 8:
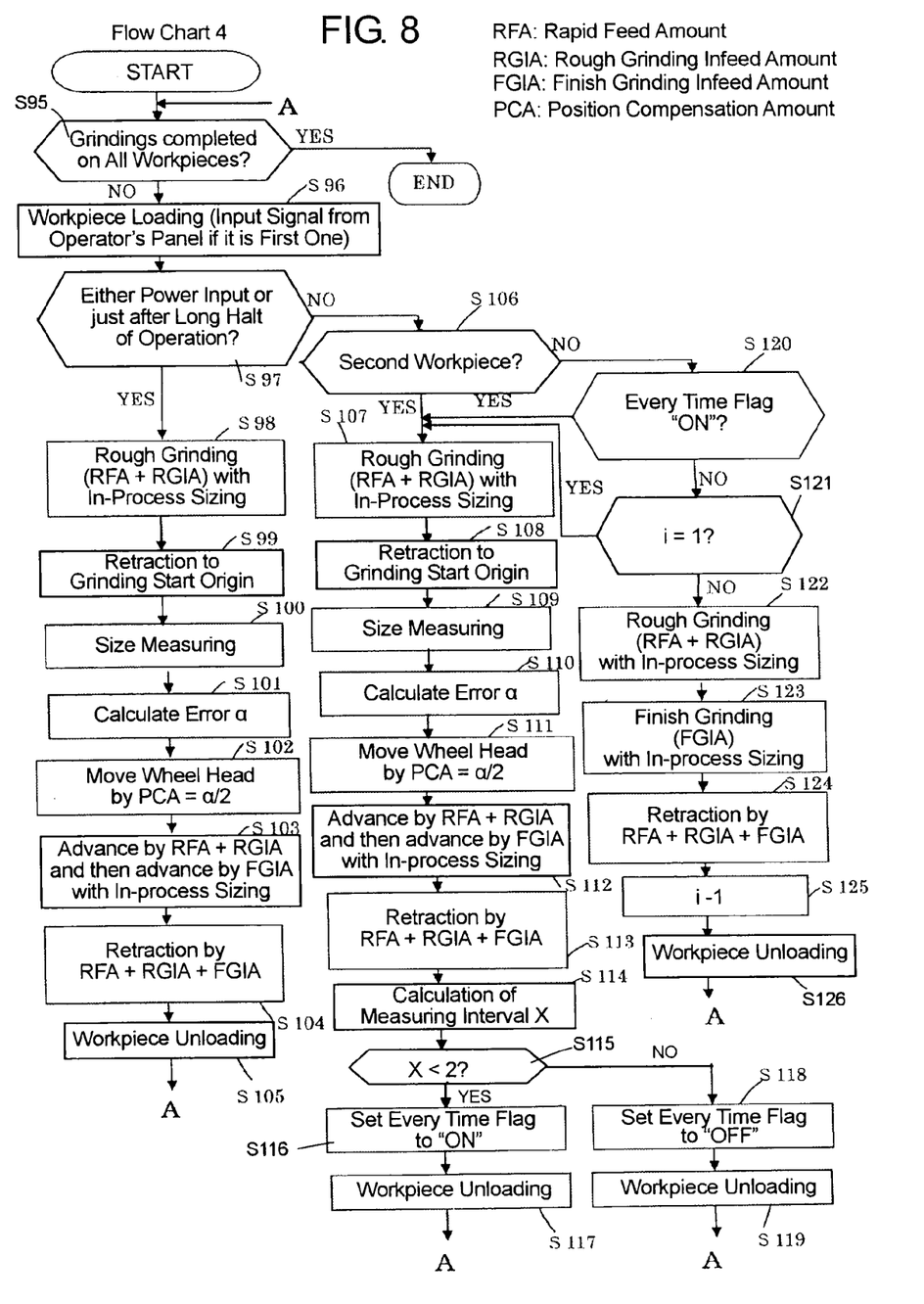
FIG. 8 is a flow chart 4 executed by the numerical controller in setting a size measuring interval for the grinding machine in the application of a post-process sizing control in a fourth embodiment.

In the foregoing third embodiment, in-process measured date which is taken simultaneously during a machining is utilized as the actually measured size data. However, without being limited to utilizing the in-process measured date, it is possible, like the foregoing first embodiment, to compensate the grinding start origin of the wheel head by a position compensation amount which corresponds to an error between an actual size measured by the post-process sizing device in the course of the grinding and a theoretical size derived from calculation of a workpiece being ground with the grinding wheel. In this case, except for the workpiece which is last ground during the next size measuring interval following the last or preceding compensation of the grinding start origin, the grindings of workpieces are performed under the in-process sizing control without being subjected to the post-process sizing control. In setting the number of workpieces or the ordinal number X as the next size measuring interval (step S114), a unit or average position compensation amount ($\alpha/2/n$) is calculated by dividing the position compensation amount (i.e., half $\alpha/2$ of the error $\alpha$) which the origin compensation means determines for the last workpiece in the present size measuring interval, by the number (n) of workpieces ground during the present size measuring interval. Then, the number of workpieces or the ordinal number X as the next size measuring interval is set by the size measuring interval setting means based on the unit or average position compensation amount ($\alpha/2/n$).

FIG. 8 shows a flow chart 4 (composed of steps S95-S126) used in setting the next size measuring interval in the case of the post-process sizing control in the fourth embodiment. One of the differences from the foregoing first embodiment is that at each of steps S98 and S107 corresponding to steps S4 and S13 shown in FIG. 3, the workpiece is ground under the in-process sizing control while the diameter of the same is measured by the size measuring device 18. Other differences are that at each of steps S103 and S112 respectively corresponding to steps S9 and S18 in FIG. 3, the in-process sizing control (i.e., the grinding operation control with the workpiece diameter measured by the size measuring device 18) is performed simultaneously with the finish grinding of the workpiece and that at each of steps S122 and S123 respectively corresponding to steps S28 and S29 in FIG. 3, the rough grinding and finish grinding of a workpiece are performed as the diameter of the same is being measured under the in-process sizing control. Other steps than mentioned above are the same as those in the foregoing first embodiment. Accordingly, also in the present fourth embodiment, because the next size measuring interval for sizing control can be set in dependence on the latest state of the grinding machine, any unnecessary measuring for sizing control can be prevented from being carried out, so that it becomes possible to efficiently perform the post-process sizing control and to improve the productivity through the shortening of the machining cycle time. Nevertheless, there can be obtained products which fully satisfy the process capability.

The invention in the forth embodiment is likewise applicable not only to the foregoing first embodiment wherein the grinding start origin is altered by the half $\alpha/2$ of the error $\alpha$ each time the post-process sizing control is executed to compensate the position of the wheel head 19 by the same amount after the successive grindings of workpieces and wherein the wheel head 19 is retracted to the compensated grinding start origin in the retraction operation, but also to the post-process sizing control in the foregoing second embodiment wherein the wheel head 19 is controlled to be retracted to the initial grinding start origin in the retraction operation without altering the initial grinding start origin, and the same effects as those accomplished in the foregoing second embodiment can be realized even in the case that the foregoing second embodiment is so modified.

All of the foregoing embodiments have been described in the form of successively grinding a plurality of workpieces having one portion to be ground thereon. However, the foregoing embodiments may likewise be practiced in the form of successively grinding plural portions of each workpiece and successively grinding a plurality of such workpieces.

Figure 3:
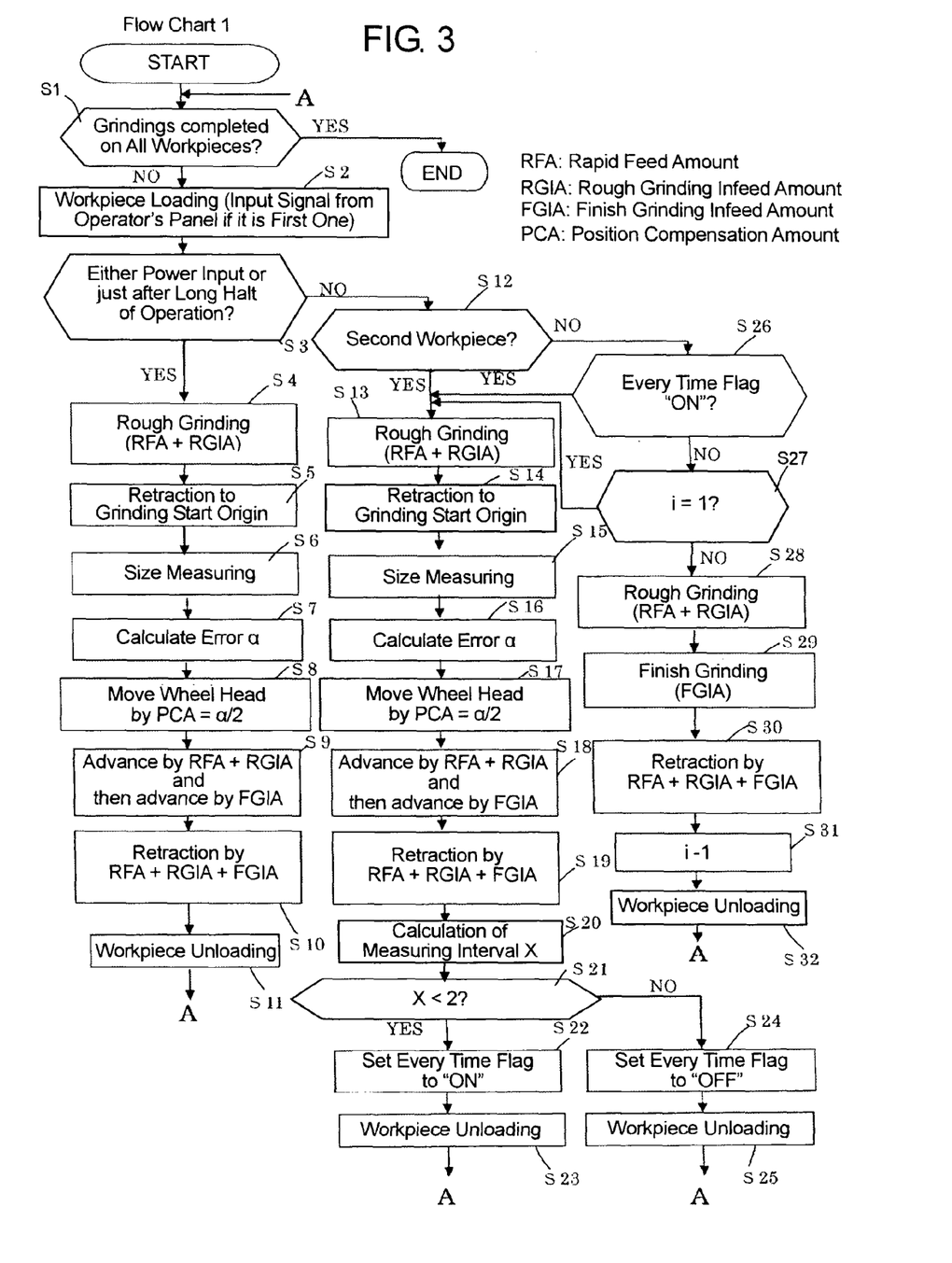
FIG. 3 is a flow chart 1 executed by the numerical controller in setting a size measuring interval for the grinding machine in a first embodiment.

Various features and many of the attendant advantages in the foregoing embodiment will be summarized as follows:

In the foregoing first embodiment typically shown in FIG. 3, in setting the number of workpieces which should be ground during the next size measuring interval which begins after the preceding position compensation operation and ends with the next position compensation operation, the number of workpieces ground during the next size measuring interval is set based on a unit or average position compensation amount ($\alpha/2/n$) derived by dividing the position compensation amount ($\alpha/2$) which the origin compensation means determines for the last workpiece during the present size measuring interval, by the number (n) of workpieces ground during the present size measuring interval. Therefore, the size measuring interval for sizing control can be set in dependence on the latest state of the grinding machine in the present size measuring interval, and any unnecessary measuring for sizing control can be prevented from being carried out, so that it becomes possible to efficiently perform the post-process sizing control and to improve the productivity through the shortening of the machining cycle time.

Also in the foregoing first embodiment typically shown in FIG. 3, a target accuracy (P) is set based on a tolerance for the portions to be ground and a process capability of the grinding machine, and then, the number of workpieces which should be ground during the next size measuring interval is set based on a quotient which is derived from the target accuracy (P) and the average machining error ($\alpha/n$), that is, by dividing the target accuracy (P) by the average machining error ($\alpha/n$). Therefore, the size measuring interval for sizing control can be set in dependence on the latest state of the grinding machine in the present size measuring interval, and any unnecessary measuring for sizing control can be prevented from being carried out, so that it becomes possible to efficiently perform the post-process sizing control and to improve the productivity through the shortening of the machining cycle time. Nevertheless, there can be obtained products which fully satisfy the process capability.

Figure 4:
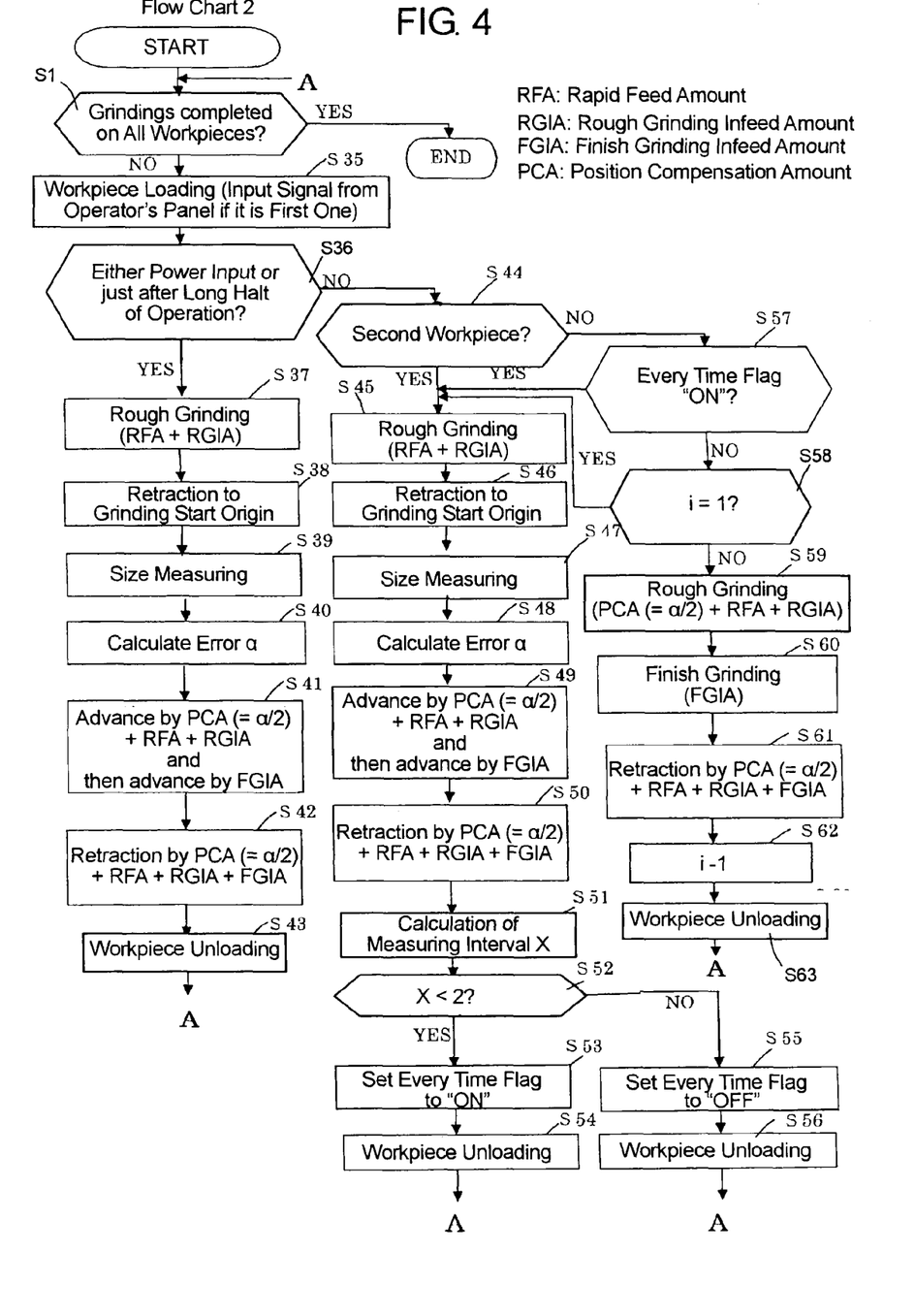
FIG. 4 is a flow chart 2 executed by the numerical controller in setting a size measuring interval for the grinding machine in a second embodiment.

In the foregoing second embodiment typically shown in FIG. 4, in setting the number of workpieces which should be ground during the next size measuring interval which begins after the preceding position compensation operation and ends with the next position compensation operation, an average position compensation difference $\{(\alpha1/2-\alpha2/2)/n\}$ is calculated by dividing a difference ($\alpha1/2-\alpha2/2$) between position compensation amounts ($\alpha1/2$, $\alpha2/2$) which the wheel head position compensation means determines for the respective last workpieces ground during the preceding and present size measuring intervals, by the number (n) of workpieces ground during the present size measuring interval, and then, the number of workpieces which should be ground during the next size measuring interval is set based on the average position compensation difference. Therefore, the next size measuring interval for sizing control can be set in dependence on the latest state of the grinding machine, and any unnecessary measuring for sizing control can be prevented from being carried out, so that it becomes possible to efficiently perform the post-process sizing control and to improve the productivity through the shortening of the machining cycle time.

Obviously, numerous modifications and variations of the present invention are possible in light of the above teachings. It is therefore to be understood that within the scope of the appended claims, the present invention may be practiced otherwise than as specifically described herein.

What is claimed is:

1. A post-process sizing control device for a grinding machine having a workpiece support device for rotatably supporting a workpiece about a rotational axis; a wheel head rotatably carrying a grinding wheel and movable relative to the workpiece in a direction intersecting with the rotational axis; and a size measuring device for measuring the size of the workpiece; the post-process sizing control device comprising:

origin compensation means for controlling the size measuring device to measure an actual size of a portion of the workpiece ground with the grinding wheel on the wheel head which is advanced by a predetermined amount in the direction and for compensating the origin of the wheel head by a position compensation amount which corresponds to a difference between the actual size and a theoretical size derived from calculation which the portion should reach when the wheel head is advanced by the predetermined amount; and size measuring interval setting means for setting the number of workpieces which should be ground during the next size measuring interval which begins after the preceding position compensation operation and ends with the next position compensation operation each of which is performed by the origin compensation means;

wherein the size measuring interval setting means calculates an average position compensation amount by dividing a position compensation amount which the origin compensation means determines for the last workpiece during the present size measuring interval, by the number of the workpieces ground during the present size measuring interval, and then sets the number of workpieces which should be ground during the next size measuring interval based on the average position compensation amount.

2. The post-process sizing control device as set forth in claim 1, wherein the size measuring interval setting means sets a target accuracy based on a tolerance for the portions to be ground and a process capability of the grinding machine and then sets the number of workpieces which should be ground during the next size measuring interval, based on a quotient derived by dividing the target accuracy by the average position compensation amount.

3. A post-process sizing control device for a grinding machine having a bed; a work head mounted on the bed and rotatably supporting a work spindle for supporting a workpiece with a non-circular portion thereon to be ground; a wheel head rotatably carrying a grinding wheel and mounted on the bed to be movable back and fourth in a direction perpendicular to a rotational axis of the work spindle; a control device for controlling the work spindle and the wheel head to perform a profile generating motion by correlating the rotation of the work spindle and the back and forth movement of the wheel head in accordance with profile data defining a finish shape of the non-circular portion while advancing the wheel head in the feed direction to infeed the grinding wheel against the non-circular portion; and a size measuring device for measuring the size of the non-circular portion; the post-process sizing control device comprising:

origin compensation means for controlling the size measuring device to measure an actual size of the non-circular portion after the same is ground with the grinding wheel on the wheel head which is infed by a first infeed amount while performing the profile generating motion, for compensating the origin of the wheel head by a position compensation amount corresponding to the difference between the actual size and a theoretical size derived from calculation which the non-circular portion should reach when the wheel head is advanced by the first infeed amount while performing the profile generating motion, and then for operating the control device so that the wheel head is advanced by a second infeed amount while performing the profiling generating motion; and size measuring interval setting means for setting the number of workpieces which should be ground during the next size measuring interval which begins after the preceding position compensation operation and ends with the next position compensation operation each of which is performed by the origin compensation means;

wherein the size measuring interval setting means calculates an average position compensation amount by dividing a position compensation amount which the origin compensation means determines for the last workpiece during the present size measuring interval, by the number of the workpieces ground during the present size measuring interval, and then sets the number of workpieces which should be ground during the next size measuring interval, based on the average position compensation amount.

4. A post-process sizing control device for a grinding machine having a workpiece support device for rotatably supporting a workpiece about a rotational axis; a wheel head rotatably carrying a grinding wheel and movable relative to the workpiece in a direction intersecting with the rotational axis; and a size measuring device for measuring the size of the workpiece; the post-process sizing control device comprising:

wheel head origin compensation means for controlling the size measuring device to measure an actual size of a portion of the workpiece ground with the grinding wheel on the wheel head which is advanced by a predetermined amount in the direction and for compensating the origin of the wheel head by a position compensation amount which corresponds to a difference between the actual size and a theoretical size derived from calculation which the portion of the workpiece should reach when the wheel head is advanced by the predetermined amount; and size measuring interval setting means for setting the number of workpieces which should be ground during the next size measuring interval which begins after the preceding position compensation operation and ends with the next position compensation operation each of which is performed by the wheel head origin compensation means;

wherein the size measuring interval setting means calculates an average position compensation difference by dividing a difference between position compensation amounts which the wheel head origin compensation means determines for the respective last workpieces ground during the preceding and present size measuring intervals, by the number of workpieces ground during the present size measuring interval, and then sets the number of workpieces which should be ground during the next size measuring interval, based on the average position compensation difference.

5. The post-process sizing control device as set forth in claim 4, wherein the size measuring interval setting means sets a target accuracy based on a tolerance for the portions to be ground and a process capability of the grinding machine and then sets the number of workpieces which should be ground in the next size measuring interval, based on a quotient derived by dividing the target accuracy by the average position compensation difference.

6. A post-process sizing control device for a grinding machine having a bed; a work head mounted on the bed and rotatably supporting a work spindle for supporting a workpiece with a non-circular portion thereon to be ground; a wheel head rotatably carrying a grinding wheel and mounted on the bed to be movable back and fourth in a direction perpendicular to a rotational axis of the work spindle; a control device for controlling the work spindle and the wheel head to perform a profile generating motion by correlating the rotation of the work spindle and the back and forth movement of the wheel head in accordance with profile data defining a finish shape of the non-circular portion while advancing the wheel head in the feed direction to infeed the grinding wheel against the non-circular portion; and a size measuring device for measuring the size of the non-circular portion; the post-process sizing control device comprising:

wheel head origin compensation means for controlling the size measuring device to measure an actual size of the non-circular portion after the same is ground with the grinding wheel on the wheel head which is infed by a first infeed amount while performing the profile generating motion, for compensating the origin of the wheel head by a position compensation amount corresponding to a difference between the actual size and a theoretical size derived from calculation which the non-circular portion should reach when the wheel head is advanced by the first infeed amount while performing the profile generating motion, and then for operating the control device so that the wheel head is advanced by a second infeed amount while performing the profiling generating motion; and size measuring interval setting means for setting the number of workpieces which should be ground during the next size measuring interval which begins after the preceding position compensation operation and ends with the next position compensation operation each of which is performed by the wheel head origin compensation means;

wherein the size measuring interval setting means calculates an average position compensation difference by dividing a difference between position compensation amounts which the wheel head origin compensation means determines for the respective last workpieces during the preceding and present size measuring intervals, by the number of workpieces ground during the present size measuring interval, and then sets the number of workpieces which should be ground during the next size measuring interval, based on the average position compensation difference.

* * * * *